United States Patent
Joshi et al.

(10) Patent No.: US 6,549,367 B1
(45) Date of Patent: Apr. 15, 2003

(54) UNIFORM LOADING DAMPED DISC CLAMP

(75) Inventors: Shantanu Dattatrey Joshi, Longmont, CO (US); Thomas M. Durrum, Broomfield, CO (US); Daniel Scott Thompson, Longmont, CO (US); James Rex Staggers, Berthoud, CO (US); Paul Allison Beatty, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 319 days.

(21) Appl. No.: 09/684,705

(22) Filed: Oct. 5, 2000

Related U.S. Application Data

(60) Provisional application No. 60/158,840, filed on Oct. 12, 1999.

(51) Int. Cl.[7] ................................................ G11B 17/02
(52) U.S. Cl. ................................. 360/98.08; 360/99.12
(58) Field of Search .......................... 360/97.01, 98.01, 360/98.07, 98.08, 99.04, 99.05, 99.08, 99.12; 369/264, 270, 271

(56) References Cited

U.S. PATENT DOCUMENTS

| | | | |
|---|---|---|---|
| 4,367,503 A | 1/1983 | Treseder | 360/98 |
| 5,274,517 A | 12/1993 | Chen | 360/98.08 |
| 5,333,080 A | 7/1994 | Ridinger et al. | 360/99.12 |
| 5,528,434 A | 6/1996 | Bronshvatch et al. | 360/98.08 |
| 5,644,451 A | 7/1997 | Chan et al. | 360/105 |
| 5,663,851 A | 9/1997 | Jeong et al. | 360/98.08 |
| 5,790,345 A | 8/1998 | Alt | 360/98.08 |
| 5,790,346 A | 8/1998 | Fletcher | 360/99.12 |
| 5,872,682 A | 2/1999 | Saichi | 360/99.12 |
| 5,877,571 A | 3/1999 | Brooks | 360/99.12 |
| 5,880,906 A | 3/1999 | Lindrose | 360/98.08 |
| 6,040,957 A | * 3/2000 | Konings | 360/98.08 |
| 6,255,750 B1 | * 7/2001 | Mohajerani et al. | 310/51 |
| 6,285,525 B1 | * 9/2001 | McCutcheon et al. | 360/98.08 |
| 6,339,516 B1 | * 1/2002 | Martin et al. | 360/99.12 |
| 6,483,661 B1 | * 11/2002 | Martin et al. | 360/99.12 |

FOREIGN PATENT DOCUMENTS

| | | |
|---|---|---|
| EP | 0 366 311 A2 | 5/1990 |
| EP | 0 573 250 A1 | 12/1993 |
| GB | 2230891 A | 10/1990 |
| JP | 60-136943 A * | 7/1985 |
| JP | 11-16316 A * | 1/1999 |
| JP | 2000076762 | 3/2000 |
| WO | WO 95/13614 | 5/1995 |
| WO | WO 00/63902 | 10/2000 |

* cited by examiner

*Primary Examiner*—Jefferson Evans
(74) *Attorney, Agent, or Firm*—Merchant & Gould P.C.

(57) ABSTRACT

The performance of a leaf spring disc clamp can be enhanced by utilizing a roughly triangular shape for the center aperture. Such a disc clamp exhibits a substantially more uniform distribution of clamping force on the data disc and thereby reduces the deformation of the disc. It has further been determined that a stiffening rib located adjacent to the rim portion which contacts the data disc also leads to more uniform distribution of clamping force. Lastly, vibrations in a leaf spring disc clamp from external shocks or drive operation can be reduced utilizing a dampening ring of visco-elastic material. The dampening ring can be fastened to the surface of the disc clamp or placed within a rib on the disc clamp.

18 Claims, 5 Drawing Sheets

UNIFORM LOADING DAMPED DISC CLAMP

RELATED APPLICATIONS

This application claims priority of U.S. provisional application Ser. No. 60/158,840, filed Oct. 12, 1999.

FIELD OF THE INVENTION

This application relates generally to disc drives and more particularly to a clamping mechanism for retaining one or more data storage disc on a spin motor.

BACKGROUND OF THE INVENTION

Disc drives are data storage devices that store digital data in magnetic form on a rotating storage medium on a disc. Modern disc drives comprise one or more rigid discs that are typically coated with a magnetizable medium and mounted on the hub of a spin motor for rotation at a constant high speed. Information is stored on the discs in a plurality of concentric circular tracks typically by transducers ("heads") mounted to an actuator assembly for movement of the heads relative to the discs. During a write operation, data is written onto the disc track and during a read operation the head senses the data previously written on the disc track and transfers the information to the external environment. Critical to both of these operations is the accurate positioning of the head over the center of the desired track.

The heads are each mounted via flexures at the ends of actuator arms that project radially outward from the actuator body or "E" block. The actuator body typically pivots about a shaft mounted to the disc drive housing adjacent to the outer extreme of the discs. The pivot shaft is parallel to the axis of rotation of the spin motor and the discs, so that the heads move in a plane parallel to the surfaces of the discs.

Typically, such actuator assemblies employ a voice coil motor to position the heads with respect to the disc surfaces. The voice coil motor typically includes a flat coil mounted horizontally on the side of the actuator body opposite the actuator arms. The coil is immersed in a vertical magnetic field of a magnetic circuit comprising one or more permanent magnets and vertically spaced apart magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the head to move back and forth in an arcuate fashion between an inner radius and an outer radius of the discs.

Modern disc drives typically include one or more discs mounted to the spin motor. Spacers are used to provide the separation between discs necessary for the actuators arms to movably locate the heads in relation with the disc surfaces. The discs and spacers collectively form a disc stack assembly, or disc pack, that is mounted on the spin motor hub and held together with a leaf spring disc clamp.

Disc clamps can be either stamped or milled. While milled clamps are more rigid and less prone to deflecting the abutting disc surface, they are relatively expensive to produce. Consequently, stamped leaf spring disc clamps, which are substantially less expensive, have become popular. The clamp is typically a circular spring-steel, sheet metal structure having a central portion and a rib portion at or near the outside diameter of the clamp, with an annular rib formed in the rim portion of the clamp. The central portion of the leaf spring disc clamp has a partial aperture that is bent or deflected toward the center of the clamp, forming a leaf spring above the level of the annular rib, and includes a plurality of screw holes spaced symmetrically about the central portion of the clamp. The screws used to mount the disc clamp springingly bend and deflect the central portion of the clamp toward the upper surface of the motor spindle as the screws are tightened, thereby forcing the annular rib into firm contact with the uppermost disc surface and applying a clamping force to the disc stack.

This type of disc clamp is not without problems. The disc clamp is secured with a plurality of screws, typically 3, circumferentially spaced around the center of the clamp. The majority of the clamping force is exerted by the rib portion adjacent the screw locations, with a significantly reduced level of clamping force, and often no clamping force at all, exerted by the rib portion between the screw locations. This variation in clamping force can mechanically distort the discs in a phenomenon sometimes referred to as "potato chipping," meaning that the portions of the disc nearest the clamp screws are displaced further than the portions of the disc between the screws.

Disc drives are subject to external shocks and must be designed to meet certain specified shock requirements. The non-uniform clamping force from current disc clamp design requires higher clamping forces to prevent disc slip from external shocks to the disc drive and the higher clamping forces increase the severity of "potato chipping."

One solution to "potato chipping" is to increase the number of mounting screws used to secure the disc clamp to the spin motor hub. As more screws are used and are spaced closer together, the discrepancy in clamping force is reduced but not eliminated. A disadvantage of this approach is that the use of additional screws complicates the manufacturing and assembly process and increases costs.

Mechanical distortion of the disc surface can, in turn, lead to undesirable variations in the read/write signals detected and written by the heads of the disc drive. Since the heads will fly at varying heights around the circumference of the disc while attempting to follow a distorted disc, the signals used to read and write data on the discs may be inadequate to ensure reliable data storage and recovery.

Another problem encountered with the current disc clamps is the transfer of vibrations from the discs to the clamp. Current disc clamps do not dampen vibrations from shocks to the disc drive and the vibrations can resonate in the disc clamp or set it to "ringing." This "ringing" then is transferred to the discs. Vibrations in the discs are an additional source of undesirable variations in the read/write signals detected and written by the heads.

Accordingly there is a need for a mechanism that would more evenly distribute the force applied to the disc surface from the disc clamp and also dampen vibrations in the disc clamp.

SUMMARY OF THE INVENTION

Against this backdrop the present invention has been developed. The performance of a disc clamp can be enhanced by utilizing a roughly triangular shape for the center aperture. Such a disc clamp exhibits a substantially more uniform distribution of clamping force and reduces the "potato chipping" of the disc. It has further been determined that a stiffening rib located adjacent to the rim portion which contacts the data disc also leads to more uniform distribution of clamping force. The invention has advantages over other mechanisms in that it does not require additional screws, other parts, or a significant change in the manufacturing process.

Accordingly, an aspect of the invention is found in utilizing a roughly triangular shaped central aperture in a disc clamp fastened with three screws to distribute the clamping force more uniformly on the disc.

Another aspect of the invention is providing a stiffening rib adjacent to the annular contract surface to increase the stiffness of the contact surface and more uniformly distribute the clamping force.

Yet another aspect of the invention is fastening a dampening ring to the disc clamp to reduce the amount of vibration in the disc clamp.

These and various other features as well as advantages which characterize the present invention will be apparent from a reading of the following detailed description and a review of the associated drawings.

DETAILED DESCRIPTION

Figure 1:
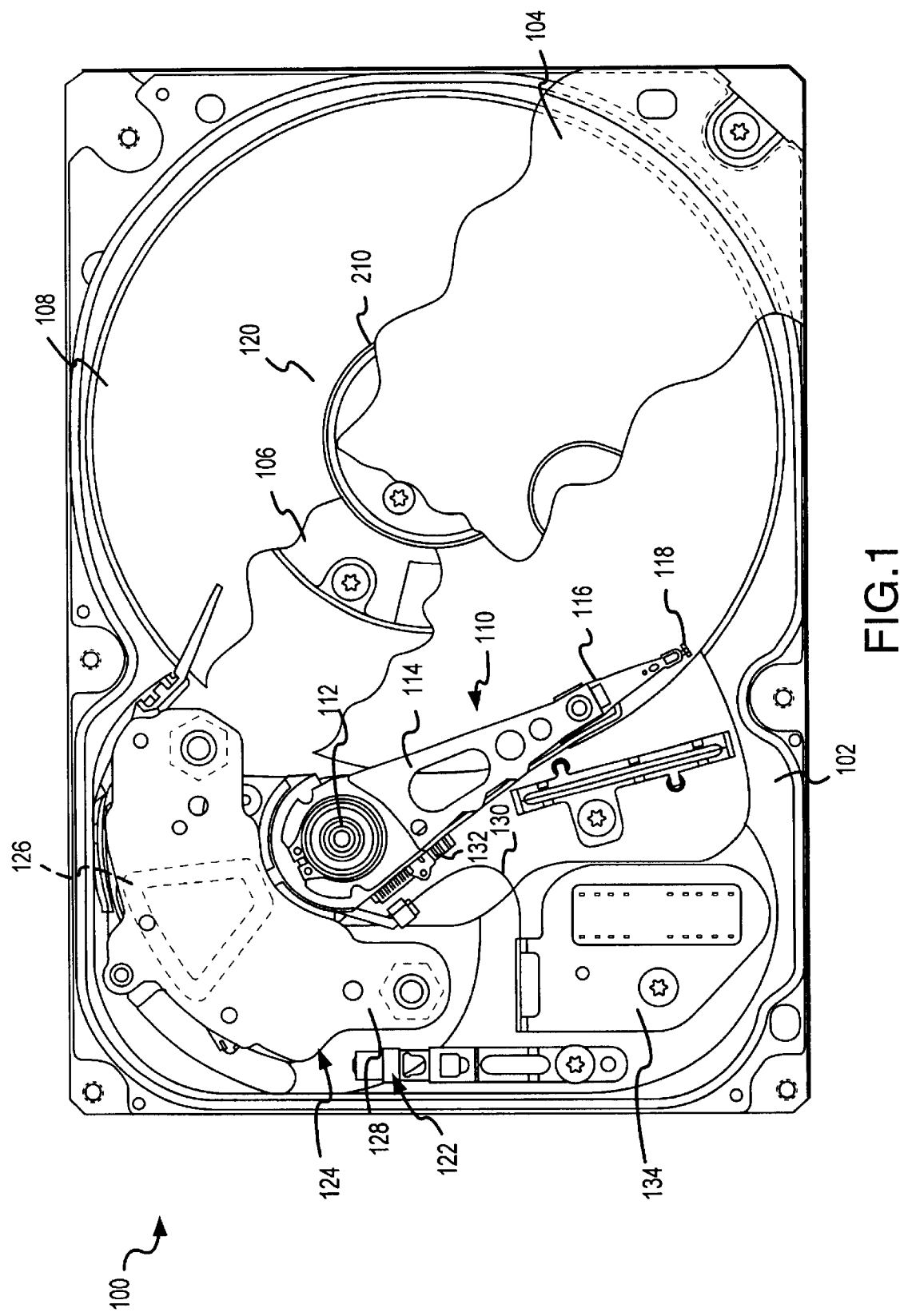
FIG. 1 is a plan view of a disc drive incorporating a preferred embodiment of a disc clamp in accordance with the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement 122, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly 130 terminates at a flex bracket 134 for communication through the base deck 102 to a disc drive printed circuit board (not shown) mounted to the bottom side of the disc drive 100.

Figure 2:
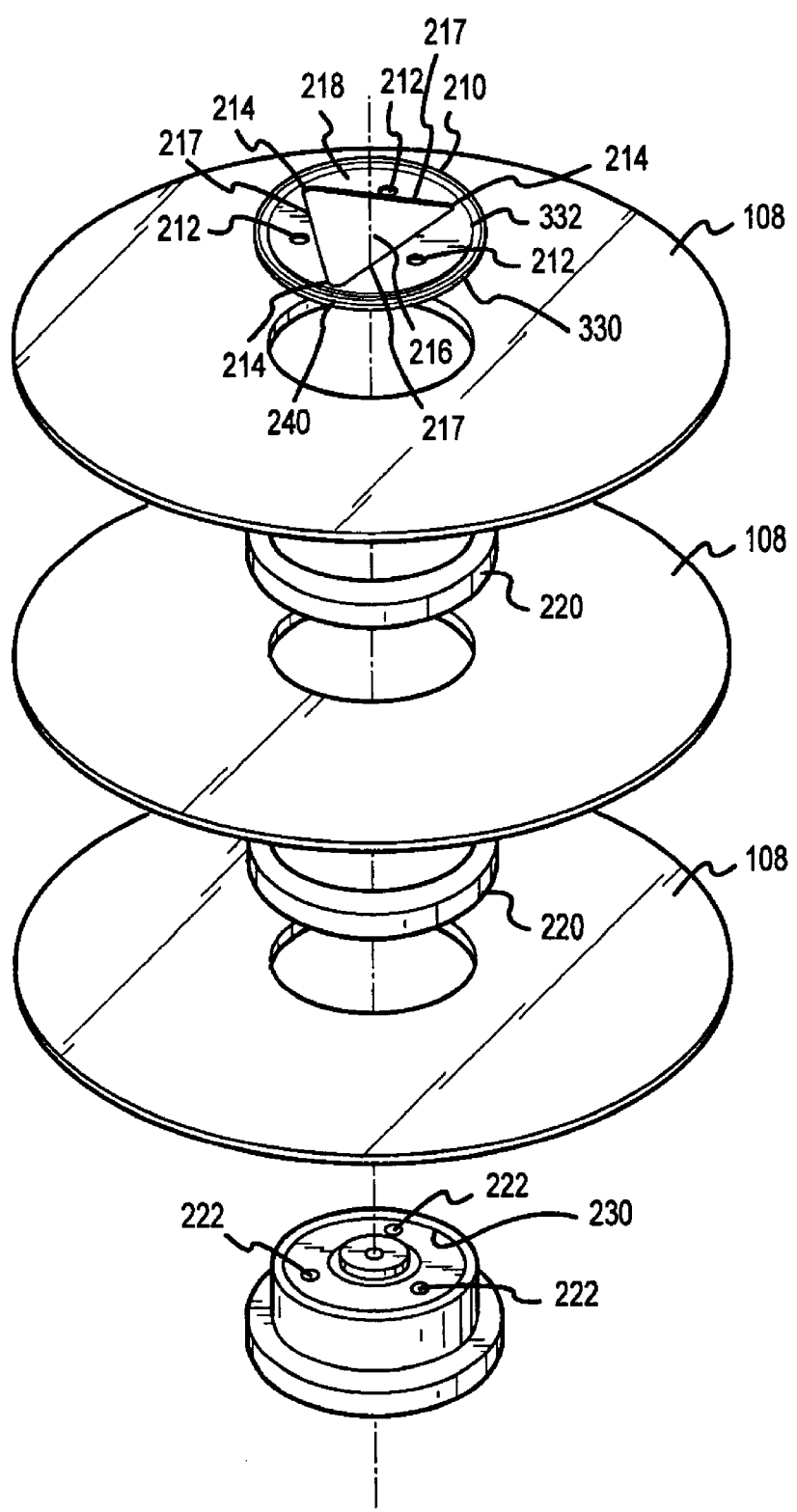
FIG. 2 is an exploded view of an exemplary disc pack assembly utilizing a disc clamp in accordance with a preferred embodiment of the present invention.

The discs 108 are secured to the hub 230 of a spin motor 106 in spaced-apart fashion. As illustrated in FIG. 2, three discs 108 are alternatively stacked together with spacers 220 that provide the vertical spacing necessary for actuator assembly function (described hereinafter). The stacked set of discs 108 and spacers 220 are mounted to the spin motor 106 via the disc clamp 210. The typical disc clamp 210 is disc shaped having an outer rim portion, a sheet metal body, and a central spring portion forming a leaf-spring type disc clamp. Any combination of discs 108 and spacers 220, along with a disc clamp 210, can be referred to as a disc assembly or disc pack. Preferably, three mounting screws (not shown) are used to secure disc clamp the 210 to the spin motor hub 230 using threaded bores 222 in the hub 230.

FIG. 2 shows the disc clamp 210 according to a preferred embodiment of the present invention. The disc clamp 210 has a bowed central leaf spring portion 218 that has a triangular central aperture 216. The clamp 210 also has an annular rim portion 240 having an annular contact rib 330 and a concentric annular stiffening portion 332 adjacent to the rib (better seen in the sectional views of FIGS. 6 and 7). As described hereinafter, the annular rib 330 preferably provides the contact surface between the disc clamp 210 and the upper surface of the uppermost disc 108. The adjacent stiffening portion 332 is a concentric rib 334 adjacent to the annular contact rib 330.

Figure 3:
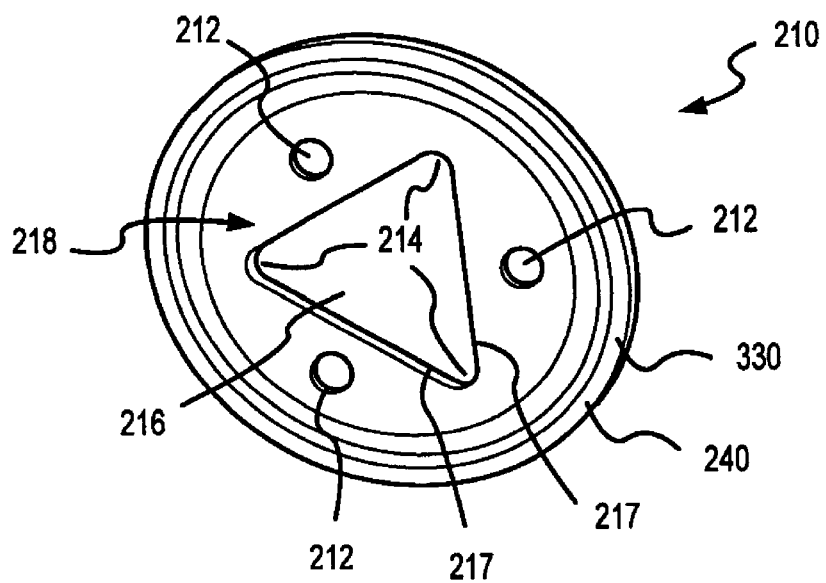
FIG. 3 is a separate perspective view of a preferred embodiment of the disc clamp in accordance with the present invention.

The disc clamp 210, as shown in FIG. 3, is a generally circular disc shaped body having a central portion 218 and a peripheral annular rim portion 240 forming an annular rib 330 and a concentric annular stiffening portion 332 adjacent to the rib 330. The central portion 218 has a triangular central aperture 216 therethrough and screw mounting holes 212 equidistantly spaced around the central aperture 216 of the disc clamp 210. The screw mounting holes 212 each receives a screw (not shown) to fasten the disc clamp 210 to the hub 230 of the spin motor 106. The disc clamp 210 further includes a corner 214 between every two adjacent screw-mounting holes 212 within the central portion 218 of the disc clamp 210. Each of the corners 214 of the central aperture 216 is rounded.

Figure 4:
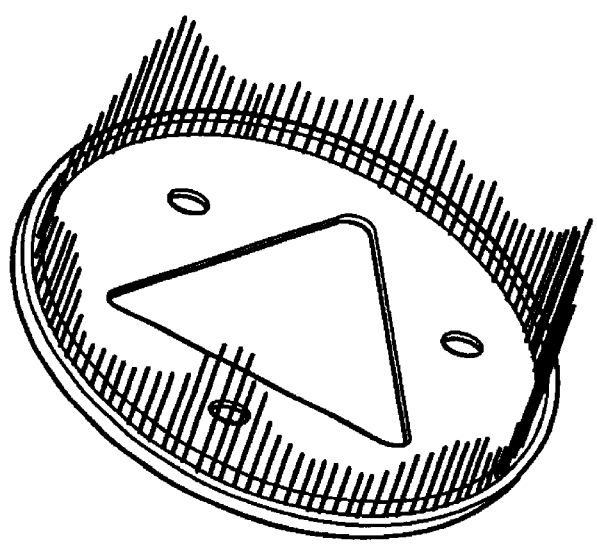
FIG. 4 is a graphical representation of the clamping force distribution of the disc clamp shown in FIG. 3.

The triangular shape of the central aperture 216 enhances the equalization of the clamping force exerted by the annular rib 330 against the disc 108, which reduces "potato chipping" of the disc 108, i.e. the disc clamp 210 reduces the distortion of the disc 108 due to clamping forces. A graphical representation of the results of a computer model of the distribution of clamping force of a disc clamp 210 with a triangular shaped central aperture 216 is shown in FIG. 4. The magnitude of the clamping force about the annular rib 330 is shown by the height of peaks superimposed on the view of the disc clamp 210. The higher the peak, the greater the clamping force at that of the annular ring 330. FIG. 4 shows that the triangular shape of the central aperture 216 performs the equalizing function in two ways. First, the triangular shaped aperture 216 more uniformly distributes the clamping force about the annular contact rib 330 than a typical disc clamp. Second, because the clamping force is more uniformly distributed, the disc clamp 210 reduces the amount of clamping force necessary to prevent disc 108 slip and meet a specified shock requirement. This, in turn, further reduces the force applied to the disc 108 and further reduces disc distortion attributable to the clamp 210.

Figure 5:
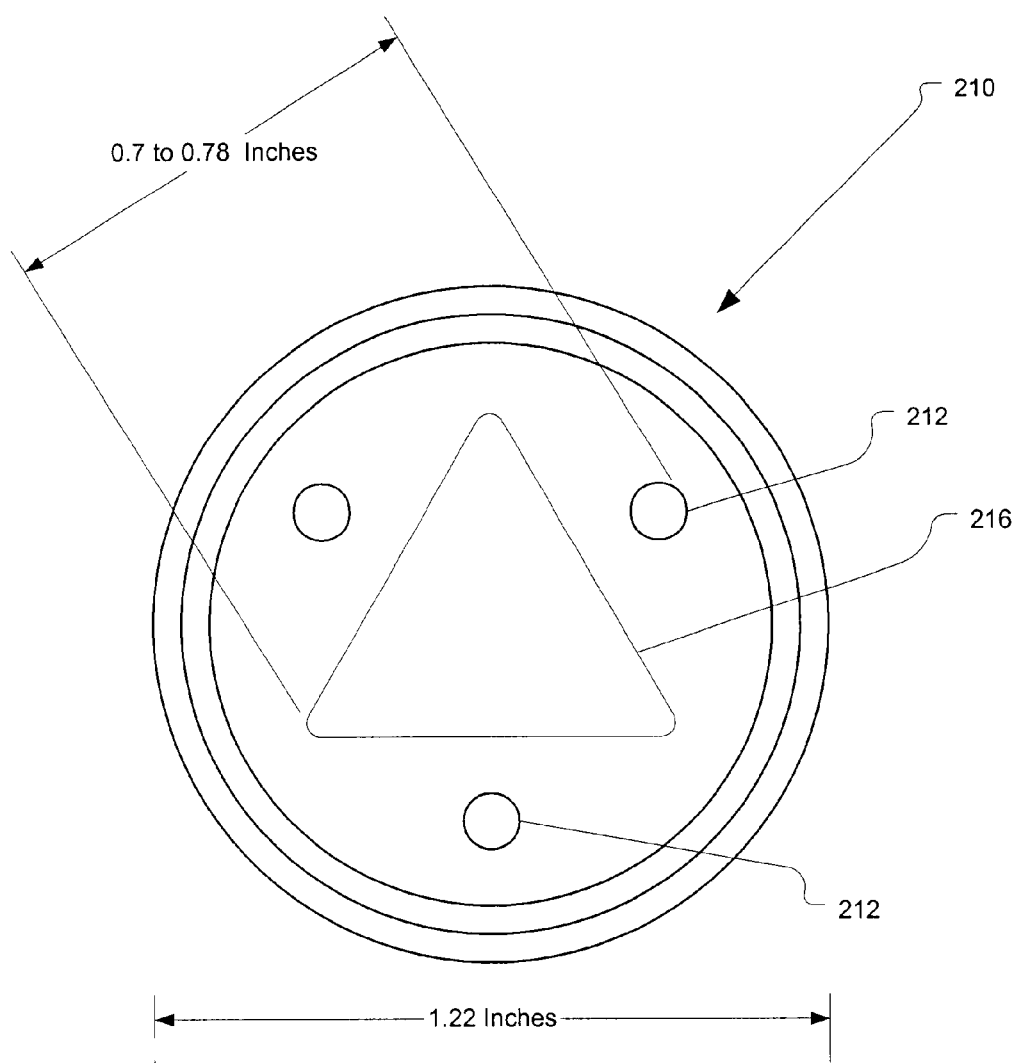
FIG. 5 is a plan view of a preferred embodiment of a disc clamp in accordance with the present invention showing the optimal range of sizes of a central aperture.

Computer modeling further determined the optimum operable range of for the triangular shaped aperture 216. For a disc clamp 210 of typical size (i.e. outer diameter of 1.22 inches and an engagement surface or contact diameter of 1.125 inches), an optimum range for the triangular shaped aperture 216 diameter is from 0.7 to 0.78 inches as measured from a corner of the aperture, through the center of the disc clamp 210, to farthest edge of the opposite screw mounting hole 212 as shown in FIG. 5. Within the optimal range, the model indicates that a diameter is 0.77 inches achieves the most substantially uniform distribution of clamping force.

Figure 6:
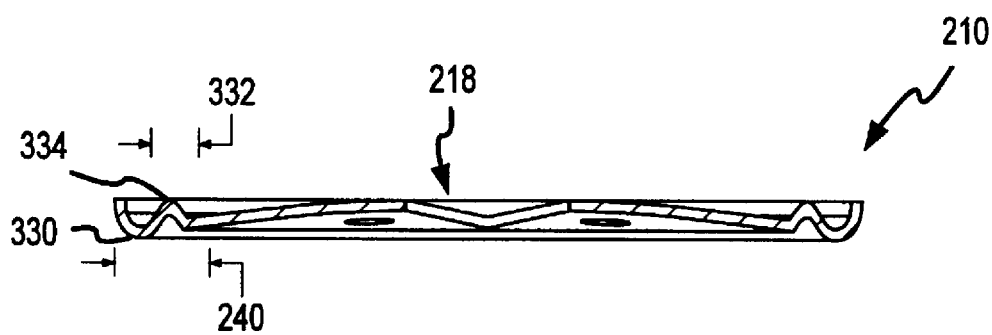
FIG. 6 is a cross-sectional view of the disc clamp shown in FIG. 3.

Another aspect of the invention is described below with reference to the cross-sectional view of the disc clamp 210 in FIG. 6. The annular rim portion 240 of the disc clamp 210 has a stiffening portion 332. The stiffening portion 332 has a stiffening rib 334 adjacent and interior to the contact rib 330. The stiffening rib 334 serves the purpose of increasing the stiffness of the contact rib 330, thus further reducing non-uniform distribution of the clamping force while in contact with the disc 108.

Figure 7:
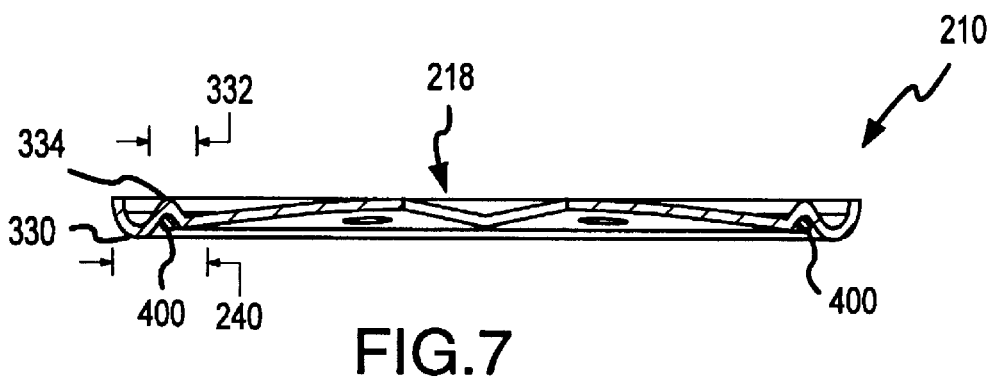
FIG. 7 is a cross-sectional view of another preferred embodiment of the present invention having a vibration dampening ring installed.

A third aspect of the invention is shown in cross-sectional view of the disc clamp 210 presented in FIG. 7. A dampening ring 400 of visco-elastic material is contained within or beneath the stiffening rib 334. The dampening ring 400 serves the purpose of dissipating vibrational energy in the disc clamp 210 from external shocks to the disc drive 100 or from disc drive operation. The dampening ring 400 eliminates "ringing" in the disc clamp 210 by dampening vibrations of frequencies including the disc clamp's resonant harmonics. FIG. 7 shows a toroidal, or O-ring shaped, dampening ring 400 having a circular cross section. However, any appropriate cross sectional shape may be used.

In summary, a preferred embodiment of the invention may be viewed as a disc clamp (such as 216) for fastening a data disc (such as 108) to a disc spin motor hub (such as 230). The disc clamp (such as 210) has a generally circular disc shaped body having a concentric central portion (such as 218) and an annular rim portion (such as 240). The central portion (such as 218) defines a generally triangular central aperture (such as 216) therethrough and has spaced apertures (such as 212) around the central aperture (such as 216) for mounting the disc clamp (such as 210) to a spin motor hub (such as 230). The rim portion (such as 240) forms an annular contact rib (such as 330) through which a distributed clamping force is applied to the data disc (such as 108).

Preferably, the disc clamp (such as 210) has three spaced apertures (such as 212) around the central aperture (such as 216). In a preferred embodiment, the triangular central aperture (such as 216) generally has the shape of an equilateral triangle wherein the corners of the central aperture (such as 216) are curved and have a radius substantially equal to that of the radius of the disc clamp (such as 210). The disc clamp (such as 210) has an outer diameter of 1.22 inches, an engagement surface or annular contact rib (such as 330) diameter of 1.125 inches, and a triangular shaped aperture (such as 216) diameter between 0.7 to 0.78 inches and preferably 0.77 inches as measured from a corner of the aperture, through the center of the disc, to farthest edge of the opposite screw mounting hole (such as 212).

The invention also may be viewed as a disc clamp (such as 210) having a generally circular disc shaped body having an annular rim portion (such as 240) having an annular contact rib (such as 330), a concentric annular stiffening portion (such as 332) adjacent to the rib (such as 330), and a central portion (such as 218). Preferably, the stiffening portion (such as 332) forms a second annular rib (such as 334) stiffening the rim portion (such as 240). In a preferred embodiment the central portion (such as 218) has a central aperture (such as 216) therethrough that is substantially triangular shaped and three spaced apertures (such as 212) around the central aperture (such as 216) each for receiving one of three fasteners.

Alternatively, the invention also may be viewed as a disc clamp (such as 210) having a generally circular disc shaped body having an annular rim portion (such as 240) and a central portion (such as 218), wherein a dampening ring (such as 400) is fixed to the annular rim portion (such as 240) to dampen vibrations in the disc clamp (such as 210). Preferably, the dampening ring (such as 400) is toroidally shaped, made of a visco-elastic material and is positioned against the stiffening portion (such as 240) to adsorb vibrations in the disc clamp (such as 210). In the preferred embodiment, the dampening ring (such as 400) is fixedly held within a stiffening rib (such as 334) in the rim portion (such as 240) of the disc clamp (such as 210).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, in alternative embodiments the dampening ring 400 can contact the surface of the disc 108 or may be placed within the contact rib 330 rather than the stiffening rib 334. The dampening ring 400 may be fixed in place by any means including, but not limited to, adhesive, press fitting or molding it in place. The corners 214 of the triangular central aperture 216 can be utilized as spanner slots to assist in placement and mounting of the disc clamp 210 to the spindle motor 106. The stiffening rib 334 or an addition stiffening rib 334 may be located exterior to the annular contact rib 330. Numerous other changes may also be made which will readily suggest themselves to those skilled in the art and which are encompassed in the spirit of the invention disclosed and as defined in the appended claims.

What is claimed is:

1. A disc clamp for fastening a data storage disc to a disc spin motor hub in a disc drive, the disc clamp comprising:

a generally circular disc shaped body having an annular rim portion and a concentric central portion, the rim portion having an annular rib for pressing against the data disc, the central portion defining a generally triangular central aperture therethrough and spaced mounting apertures around the central aperture for receiving fasteners to fasten the disc clamp to a spin motor hub and apply a distributed clamping force through the annular rib to a data storage disc carried on the spin motor hub.

2. The disc clamp according to claim 1 wherein the triangular central aperture generally has the shape of an equilateral triangle.

3. The disc clamp according to claim 1 wherein the corners of the generally triangular central aperture are curved.

4. The disc clamp according to claim 3 wherein there are three spaced apertures around the central aperture each for receiving one of three fasteners.

5. The disc clamp according to claim 4 wherein each of the curved corners of the central aperture has a radius.

6. The disc clamp according to claim 5 wherein the radius of each of the curved corners of the central aperture is substantially the same as the radius of the three spaced apertures.

7. The disc clamp according to claim 5 wherein the radius of the corners of the central aperture is substantially equal to that of the radius of the disc clamp.

8. The disc clamp according to claim 1 wherein the corners of the central aperture are located such that the distance from the outermost edge of the central aperture to the rim of the disc clamp is substantially the same as the distance from an outermost edge of the mounting apertures to the rim of the disc clamp.

9. The disc clamp according to claim 5 wherein the disc clamp has an outer diameter of about 1.22 inches, an engagement surface or contact diameter of 1.125 inches, and a triangular shaped aperture diameter of 0.7 to 0.78 inches as measured from a corner of the aperture, through the center of the disc, to a farthest edge of an opposite screw mounting hole.

10. The disc clamp according to claim 9 wherein the disc clamp has a triangular shaped aperture diameter of 0.77 inches as measured from a corner of the aperture, through the center of the disc, to the farthest edge of the opposite screw mounting hole.

11. A disc clamp for fastening a data disc to a spin motor hub in a disc drive, the disc clamp comprising:

a generally circular disc shaped body having a central portion, an annular rim portion around the central portion having an annular rib having an annular surface for contacting a data disc, and a concentric annular stiffening portion adjacent to the rib forming a second annular rib stiffening the rim portion, the second annular rib having a dampening ring positioned thereunder between the rib and the data disc, the central portion having spaced mounting apertures around a center of the disc clamp for receiving fasteners therethrough for fastening the disc clamp to the spin motor hub.

12. The disc clamp according to claim 11 wherein the central portion has a central aperture therethrough.

13. The disc clamp according to claim 12 wherein the central aperture has a substantially triangular shape.

14. A disc clamp for fastening a data disc to a spin motor hub in a disc drive comprising:

a generally circular disc shaped body having a central portion and an annular rim portion having a concentric annular stiffening portion adjacent to the central portion, the central portion having spaced mounting apertures spaced around the center of the disc clamp for receiving fasteners for fastening the disc clamp to a spin motor hub; and a dampening ring adapted to fit between the annular rim portion and the stiffening portion.

15. The disc clamp according to claim 14 wherein the dampening ring is made of a visco-elastic material positioned against the stiffening portion to adsorb vibrations in the disc clamp.

16. The disc clamp according to claim 14 wherein the dampening ring is toroidally shaped.

17. The disc clamp according to claim 14 wherein the dampening ring is fixedly held within a rib in the stiffening portion of the rim portion of the disc clamp.

18. A disc clamp device for fastening a data disc to a drive motor hub comprising:

a disc shaped body; and means on the disc clamp for distributing discretely applied clamping force substantially uniformly to the data storage disc.

* * * * *